Oct. 9, 1962 W. HANSTEIN, JR., ET AL 3,057,552

OPTICAL APPARATUS FOR READING INDICIA
APPEARING ON A RECORD MEDIUM

Filed Aug. 14, 1958 6 Sheets-Sheet 1

INVENTORS
WALTER HANSTEIN, JR.
RICHARD H. JONES

BY William R. Nolte

AGENT

Oct. 9, 1962

W. HANSTEIN, JR., ET AL

OPTICAL APPARATUS FOR READING INDICIA APPEARING ON A RECORD MEDIUM 3,057,552

Filed Aug. 14, 1958

6 Sheets-Sheet 2

INVENTORS
WALTER HANSTEIN, JR.
RICHARD H. JONES

BY *William R. Nolte*

AGENT

INVENTORS
WALTER HANSTEIN, JR
RICHARD H. JONES
BY William R. Nolte
AGENT

INVENTORS
WALTER HANSTEIN, JR.
RICHARD H. JONES
BY William R. Nolte
AGENT

Oct. 9, 1962

W. HANSTEIN, JR., ET AL

OPTICAL APPARATUS FOR READING INDICIA APPEARING ON A RECORD MEDIUM 3,057,552

Filed Aug. 14, 1958

6 Sheets-Sheet 5

INVENTORS.
WALTER HANSTEIN, JR.
RICHARD H. JONES

BY William R. Nolte

AGENT

INVENTORS
WALTER HANSTEIN, JR.
RICHARD H. JONES
BY
William R. Nolte
AGENT

United States Patent Office 3,057,552

Patented Oct. 9, 1962

3,057,552

OPTICAL APPARATUS FOR READING INDICIA APPEARING ON A RECORD MEDIUM

Walter Hanstein, Jr., Villanova, and Richard H. Jones, King of Prussia, Pa., assignors to Burroughs Corporation, Detroit, Mich., a corporation of Michigan Filed Aug. 14, 1958, Ser. No. 755,018
8 Claims. (Cl. 235—61.11)

The present invention relates to optical apparatus, and more particularly to optical apparatus for reading and storing coded indicia appearing on a record medium.

The accelerated growth of modern commerce, particularly in the field of banking, has accounted for the development of various apparatus intended to provide the rapid handling of intelligence. As a specific example, it has been found that the average check, in passing through a bank, must be added six different times as part of bank batch proof operations. The present invention facilitates this multiple handling by providing apparatus for automatically reading indicia on the checks. By applying coded indicia on the checks representative of their amounts, the checks may be read automatically by the apparatus of the present invention.

An object therefore, of the present invention is to provide apparatus for reading information coded on a record medium.

Another object of the present invention is to provide novel apparatus for reading information coded on a record medium in one form and to store the same in another form.

Still another object of the invention is to scan serially a field of fluorescent spots representing coded data, contained on a record medium and to store the same.

Another object of the invention is to scan serially a field of fluorescent spots contained on a record medium and to convert a visible light signal therefrom to a useable electrical output.

A further object of the invention is to provide a novel optical device for reading information contained on a record medium and for storing the same rapidly and economically.

In accordance with the above objects the invention in its broad aspects contemplates optically scanning a record medium containing indicia aligned in rows and columns thereon, and storing the information.

More specifically, the illustrated embodiment of the present invention contemplates optically scanning a record coded with fluorescent spots which are aligned in rows and columns. Illumination of the field causes the spots to give off light which differs in intensity from the light given off by the field. The spots are then sequentially scanned, row by row, by rotary optical means which focuses the light from each spot upon a light-sensitive device which transforms the light into an electrical signal. Synchronized with the output of the rotary optical means are signal means which together are effective to actuate means to store the coded data.

Further details and other objects of the invention will be more apparent from the following detailed description of the invention when taken in conjunction with the accompanying drawings in which.

Figure 1:
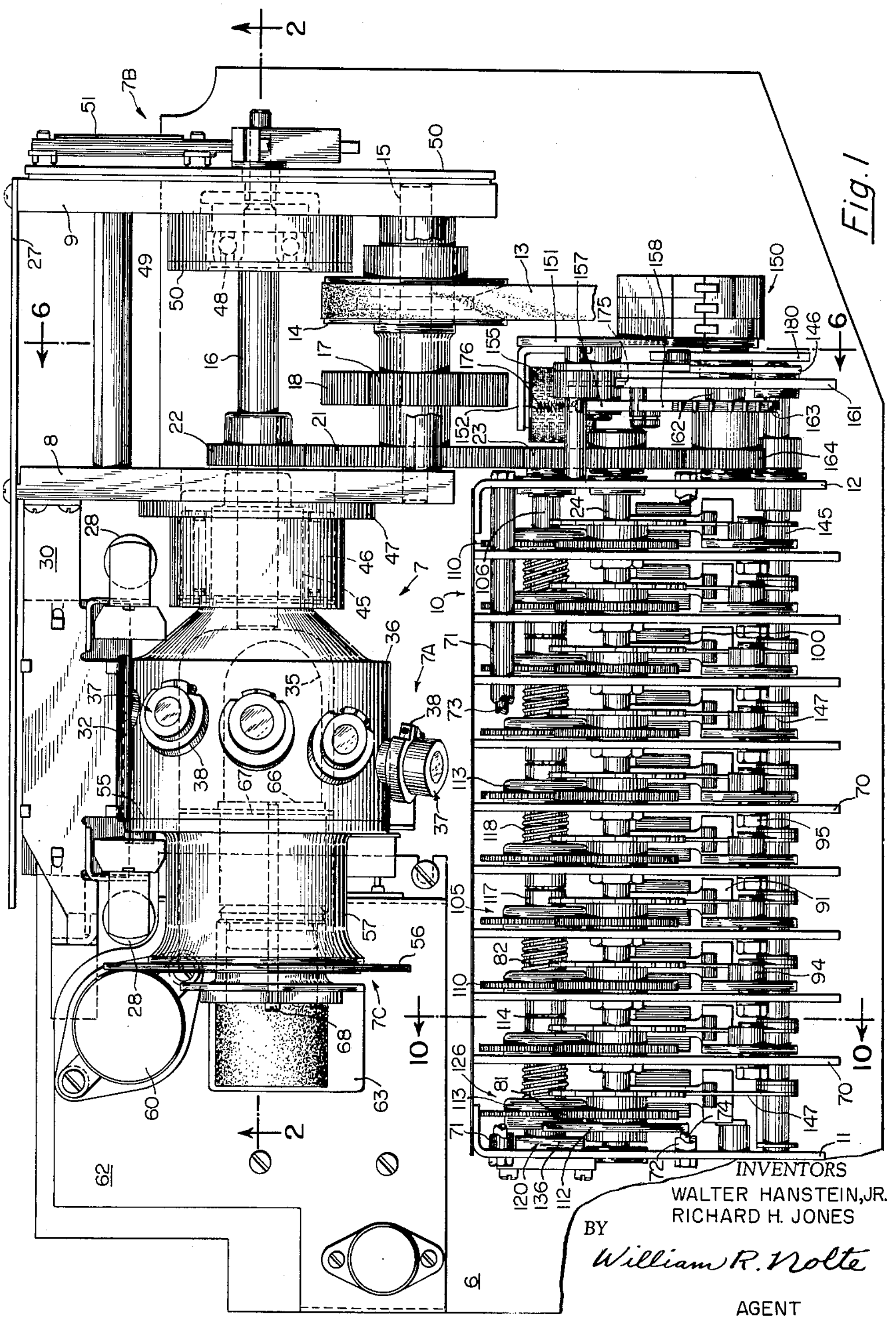
FIG. 1 is a front elevational view of the apparatus.
Figure 16:
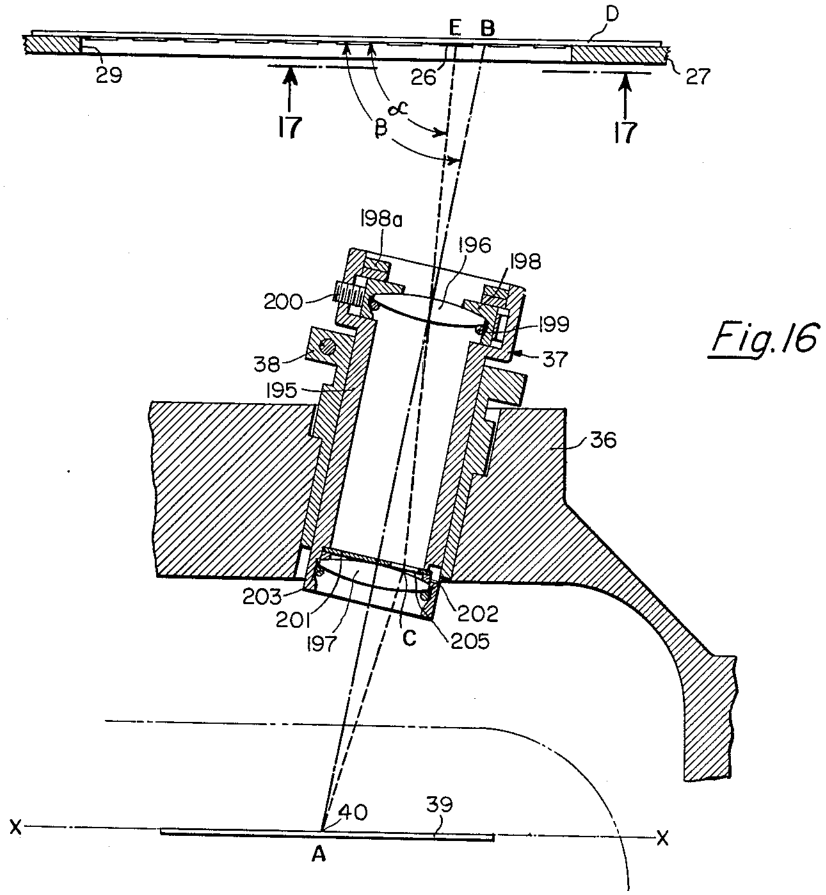
Figure 17:
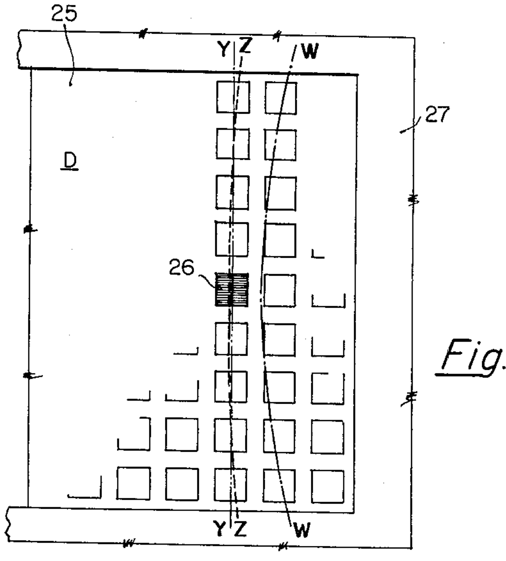
Figures 10, 11, 12, 13, 14, 15:
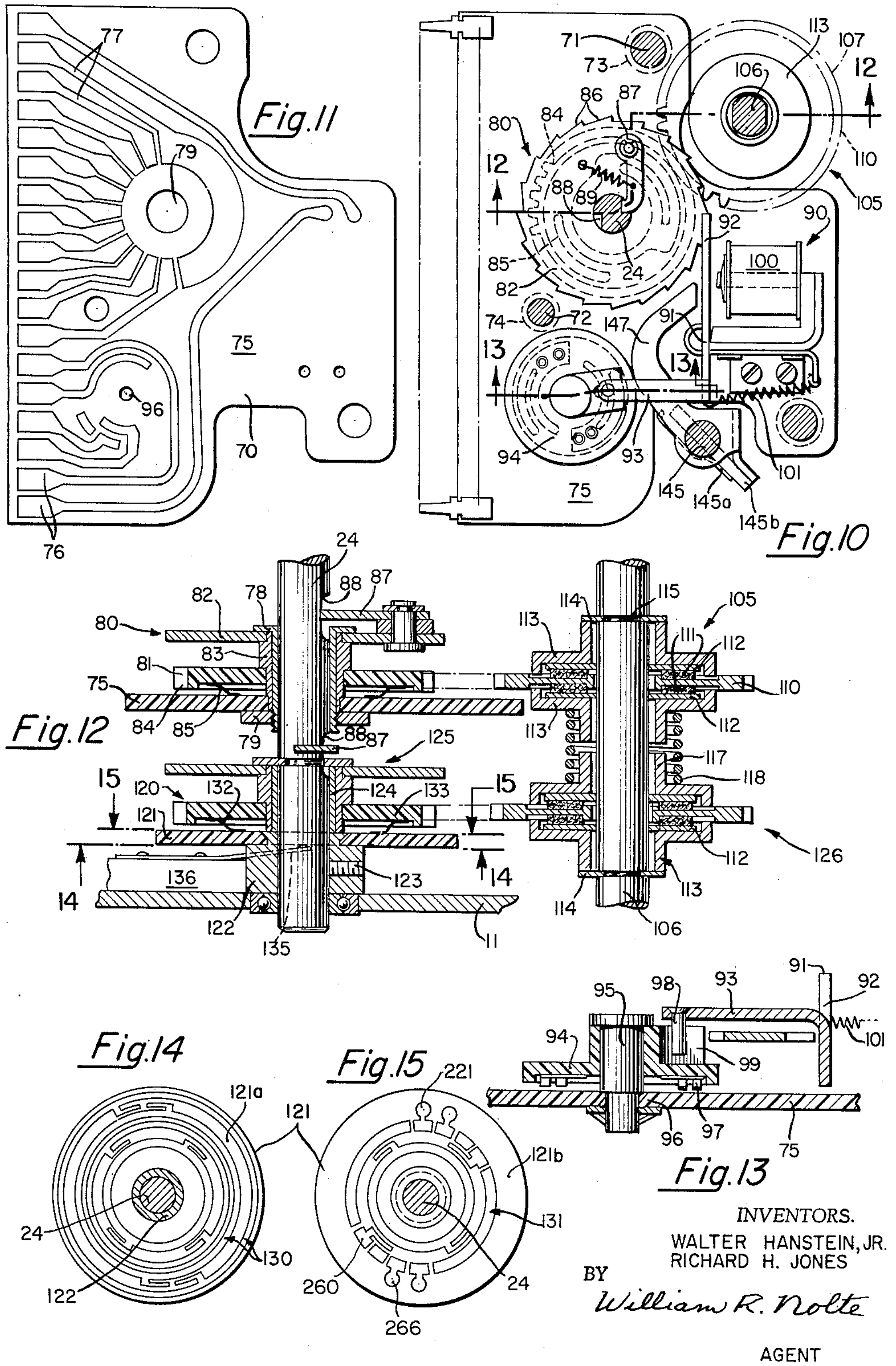
Figure 18:
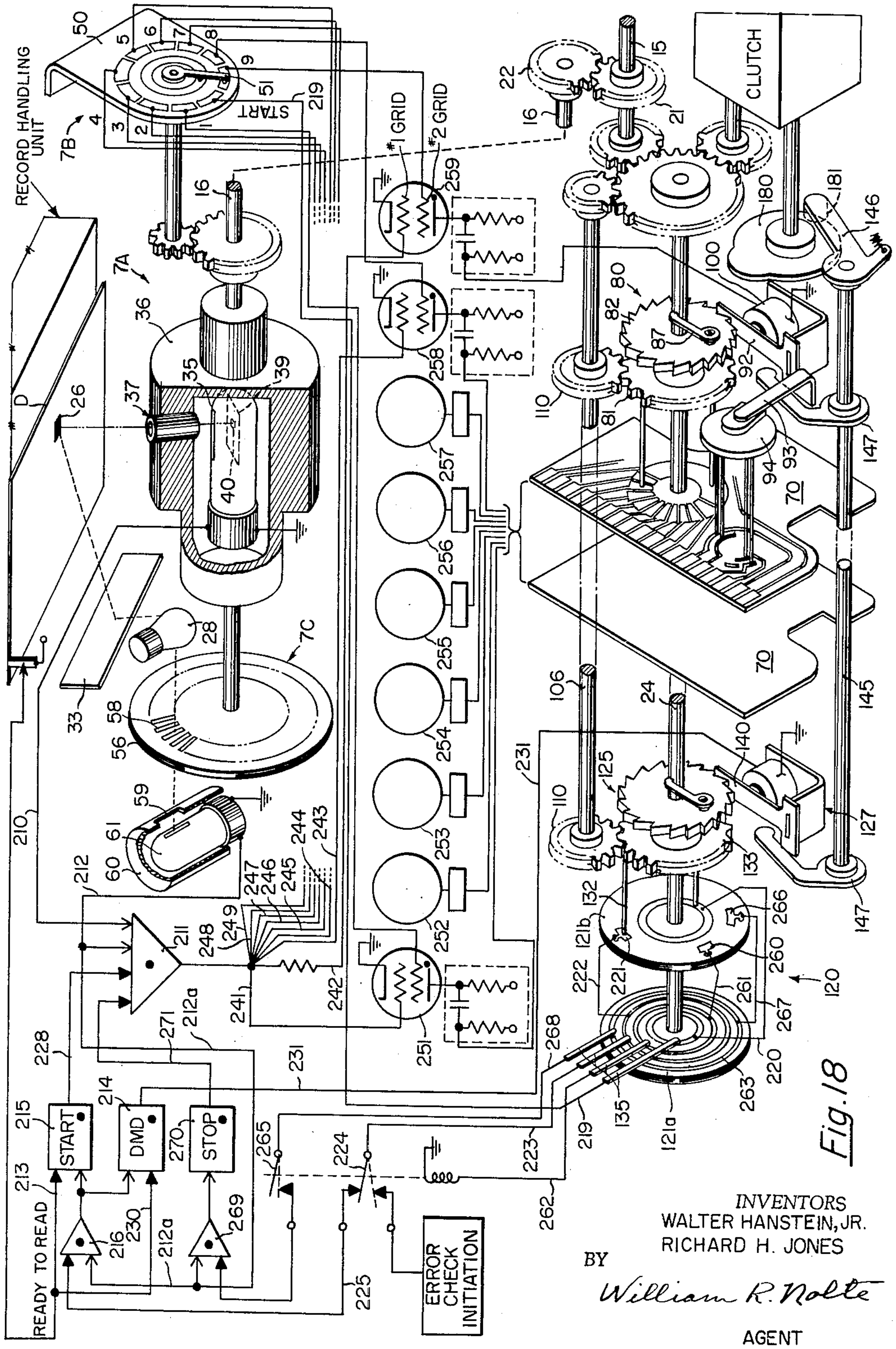

FIGS. 9A–9J, inclusive, are sectional views taken along the lines 9A—9A to 9J—9J, inclusive, showing how the notches are progressively radially offset with respect to one another along the length of the shaft;

FIG. 10 is a sectional view taken along the section line 10—10 of FIG. 1, and showing a typical circuit board assembly including the wiper gear and ratchet assembly;

FIG. 11 is a view of the circuit board shown in FIG. 10;

FIG. 12 is a sectional view taken along the line 12—12 of FIG. 10 showing a wiper and drive means therefor, as well as the differential motion disc assembly;

FIG. 13 is a sectional view taken along the line 13—13 of FIG. 10 showing the relay wiper assembly;

FIG. 14 is a sectional view taken along the line 14—14 of FIG. 12 showing one face of the differential motion disc;

FIG. 15 is a sectional view taken along the line 15—15 of FIG. 12 showing the opposite face of the differential motion disc;

FIG. 16 is a schematic view of a lens unit of the rotor;

FIG. 17 is a view taken along the line 17—17 of FIG. 16 showing a scanning trace of one lens system across the record card; and FIG. 18 is a schematic view of the apparatus embodying a preferred form of the invention.

Figures 2, 3, 4:
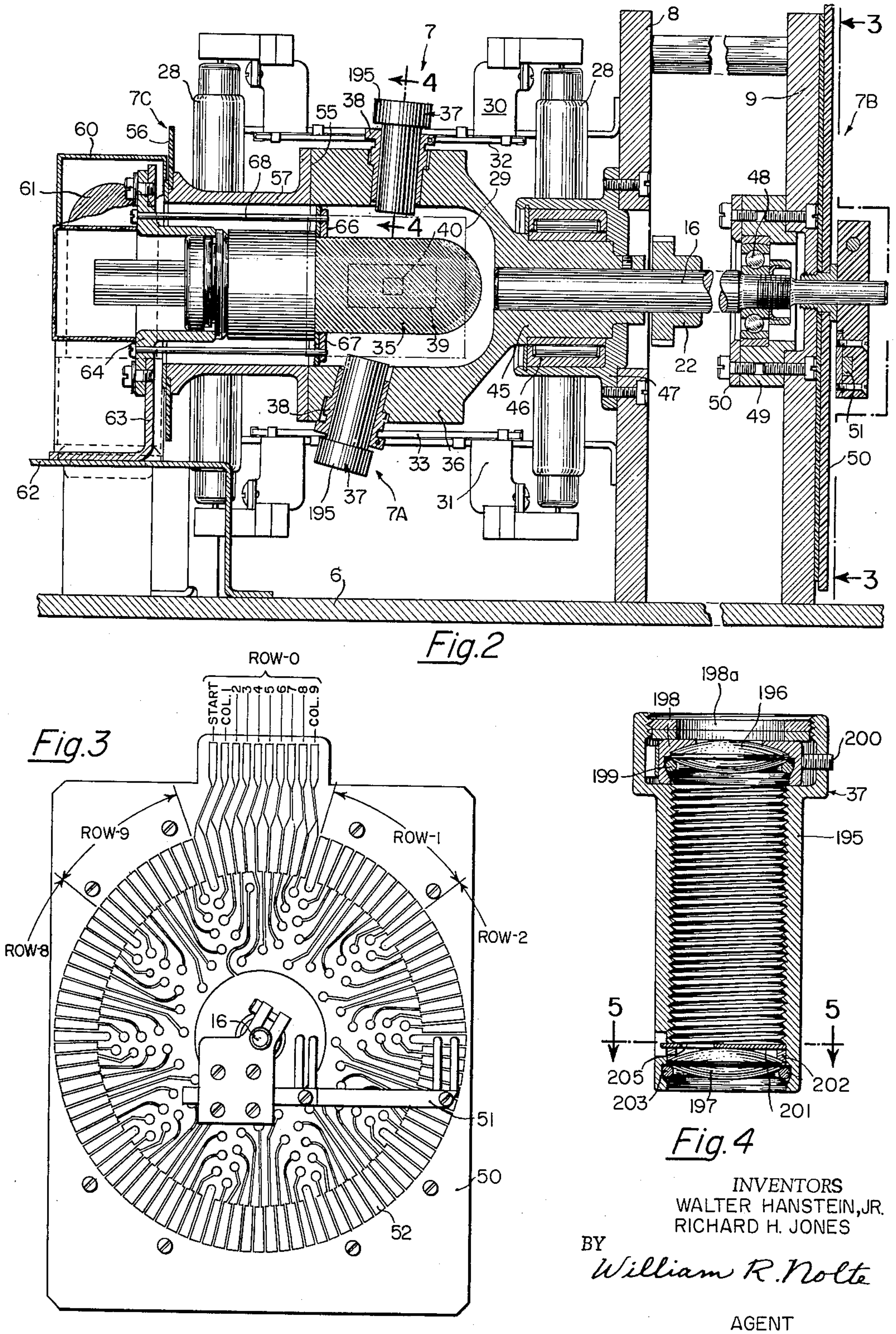
FIG. 2 is a sectional view taken along the line 2—2 of FIG. 1 with parts broken away.
FIG. 3 is a sectional view taken along the line 3—3 of FIG. 2 showing the printed circuit of the distributor.
FIG. 4 is a sectional view taken along the line 4—4 of FIG. 2 showing a typical lens assembly.

Referring to the drawings in detail, and in particular to FIGS. 1 and 2, a main base plate 6, of any suitable type, supports the entire framework and driving mechanism of the apparatus. The optical scanning unit 7 is supported by two plates 8 and 9. The storage unit 10 is supported by two plates 11 and 12.

The power for the optical scanning unit 7, and the storage unit 10, is derived from a motor (not shown), for driving a belt 13 which passes around a pulley 14 fixed to main drive shaft 15. A shaft 16, utilized for supporting the scanning unit 7 in cantilever fashion, is suitably journalled in plates 8 and 9 in a manner to be further described. A small gear 17 affixed to shaft 15 engages a larger gear 18 affixed to a shaft 19, see FIG. 6, likewise journalled for rotation in plates 8 and 9. A second gear 20, affixed to shaft 19, engages a large idler gear 21 freely rotatable on shaft 15 which, in turn, meshes with gear 22 affixed to shaft 16 to drive the latter. Gear 21, in addition, meshes with gear 23, see FIG. 6, which drives the storage shaft 24 of the storage unit 10.

Figure 7:
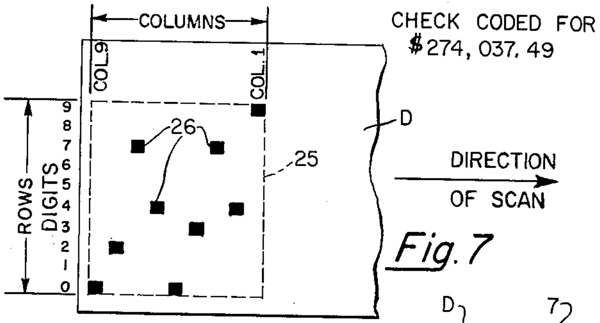
FIG. 7 is a partial view of a document coded with spots and showing nomenclature.
Figure 6:
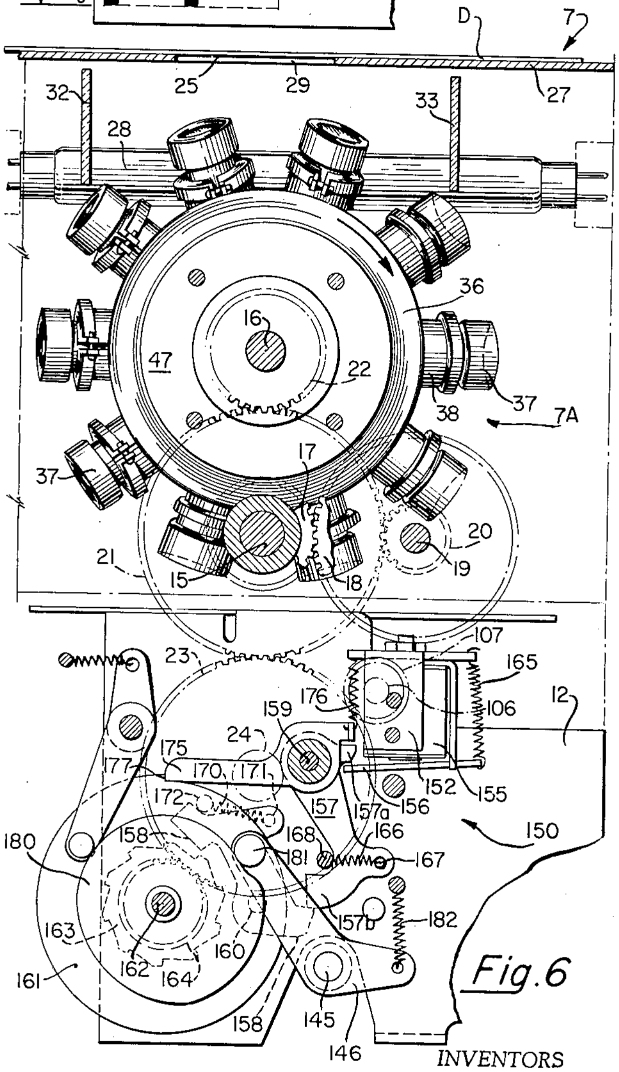
FIG. 6 is a sectional view taken along the line 6—6 of FIG. 1 with parts in phantom for clarity, and showing an endwise view of the lens rotor and also a view of the clutch.

The spot scanner unit 7, as best seen in FIGS. 1 and 2, is basically comprised of three sub-units, the reader 7A, the distributor 7B, and the clock pulser 7C. The reader is constructed to read the amount field 25 of a document D, coded with fluorescent spots 26, as shown in FIGS. 6 and 7. When the document D is properly positioned upon table 27, light from a pair of ultraviolet lamps 28 illuminates the spots 26 contained in the check field 25. The table 27 includes an aperture 29 coinciding in size with said check field, and the table as seen in FIG. 1, is supported by plates 8 and 9. The pair of ultraviolet lamps 28, as seen in FIG. 2, are mounted in spaced relationship to one another by means of brackets 30 and 31 affixed to plate 8. By means of a pair of mirrors 32 and 33, also supported by brackets 30 and 31, the illumination throughout the check field is kept approximately at the same level, such that the ultraviolet light impinging upon the spots 26 in the field causes the fluorescent ink forming the spots to give off light in the yellow-green region. In addition, light from all of the spots is focused on a photomultiplier tube 35 housed within hollow drum, or rotor, 36, by means of a plurality of lens assemblies 37.

As seen in FIG. 6, the lens assemblies are equi-angularly spaced about the periphery of the drum 36 and it is further observed that there are ten in number, one for each row of digits 0–9 inclusive. Each lens system is directed toward a different row of spots, and scans a full row. One complete rotation of the rotor 36 accomplishes a complete scanning of all nine columns of the check field. As seen in FIG. 2, two of the lens assemblies 37 are shown mounted in the rotor 36, each inclined with respect to the axis of rotation of the rotor at a different angle. Each lens assembly is received and clamped within a tube mounting bushing 38 which may be press-fitted within the rotor. Each spot which is viewed is focused on the photocathode 39 of the photomultiplier tube 35, the photocathode being fixed on the axis of rotation of the rotor. All of the lens assemblies are focused on the same area 40 of the photocathode 39, thus to avoid changes in sensitivity as between different areas thereof.

The hollow drum 36, affixed to shaft 16, tapers to a reduced portion 45 to receive bearing 46. The bearing in turn is received within bushing housing 47 and the latter is suitably secured to plate 8. The shaft 16 extends through plate 9 and is supported for rotation by bearing 48 mounted thereon by means of housing 49 suitably secured to plate 9.

The previously mentioned distributor 7B is comprised of a printed circuit board 50 secured against the outside surface of plate 9, see FIGS. 2 and 3, and a wiper 51 fixed to the shaft 16. The output of the distributor is a series of one hundred enabling pulses that are distributed to thyratron gating control circuitry later described. As seen in FIG. 3 the circuit pads 52 are in groups of ten each. The first pad of the group corresponds to a start pulse, while the remaining nine pads of each group correspond to the spot columns 1 to 9 on the document D, FIG. 7. Considering the circuit board in its entirety, ninety of the pulse outputs are each synchronized with the ninety possible spot positions on the document. The remaining ten pulses serve as starting pulses which allow the scan operation to start at any time one telescope is commencing to scan a particular row, as will be described more fully later.

Referring to FIG. 2, the scanner unit is shown as including a clock pulser 7C mounted upon the drum 36. The clock pulser constitutes an optical timing device and includes a rotatable disc 56 mounted on hub 57, the latter being suitably secured to rim 55 of drum 36. The disc 56 is slotted as shown in FIG. 18 as at 58, such that light from adjacent lamp 28 passes through a slit in the disc, through a slot 59 of shield 60 which shrouds a photomultiplier 61 mounted upon bracket 62 affixed to base plate 6, see FIGS. 1 and 2. The disc 56 is adjusted to the position of the rotor 36 such that every time a lens assembly 37 is focused and centered on a possible spot location, a slit 58 in the plastic disc 56 will exactly coincide with the stationary slit 59 in the shield 60. It should be observed that the light source 28 for these clock pulses is the same ultraviolet light that was used to illuminate the document D. It should be understood that the clock pulser acts as a fine timer to indicate the exact center of the spot that is being viewed, while the distributor 7B indicates which column containing the spot is being viewed.

The bracket 62 additionally supports photomultiplier 35 by means of mounting bracket 63, FIG. 2, affixed to bracket 62 and tube mounting bushing 64 affixed to bracket 63, and supporting the photomultiplier tube 35 at its base. The bushing 64, in addition, supports a retaining ring 66 having a felt washer 67 affixed thereto by means of retaining ring screws 68. The latter ring and washer prevents extraneous light from reaching the photomultiplier.

The storage unit 10, see FIG. 1, is geared for operation at a slower speed than the scanner unit 7. Gear 20, 21 and 23 provide a 2 to 1 gear reduction for rotation of shaft 24 of the storage unit. The storage unit functions to receive data serially and store the information read from a document by the scanner unit 7 and to clear itself in order to receive spot information from a subsequent document.

For this purpose the storage unit includes a plurality of printed circuit assemblies 70 (FIG. 1). In the embodiment of the invention illustrated there are nine of these assemblies, one associated with each of the columns on the spot field 25 of the document D, see FIGS. 1, 7, 10 and 11. Each printed circuit assembly 70 individually acts as a ten position switch, and indicates which digit is being stored in that column. As seen in FIG. 1, the assemblies are mounted in spaced parallel relation between plates 11 and 12. The aforementioned shaft 24 passes through all of the assemblies 70, and suitable spacing between individual assemblies may be achieved by means of spacers 71, 72, mounted on bolts 73 and 74, respectively, the latter passing through all of the assemblies and secured at their ends in plates 11 and 12. For purposes of clarity, the bolts and spacers are shown as extending through only a minor length of the storage unit.

Hereinafter, the description will concern itself with only a single printed circuit assembly 70, as illustrated in FIGS. 10, 11 and 12, it being understood that the description is equally applicable to the additional eight assemblies, each of which is substantially identical to the one described.

Figure 8:
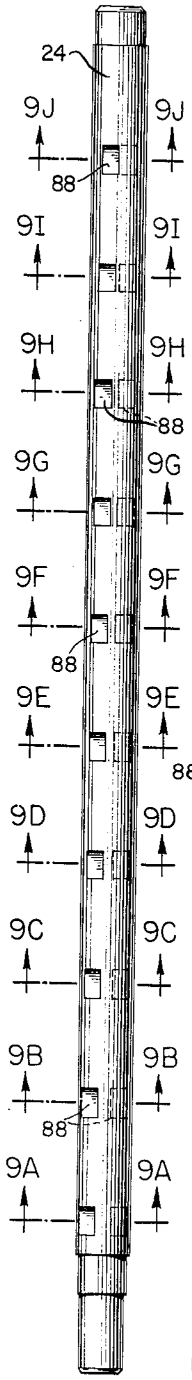
FIG. 8 is a plan view of a notched shaft which extends through the storage unit.
Figures 9A, 9B, 9C, 9D, 9E, 9F, 9G, 9H, 9I, 9J:
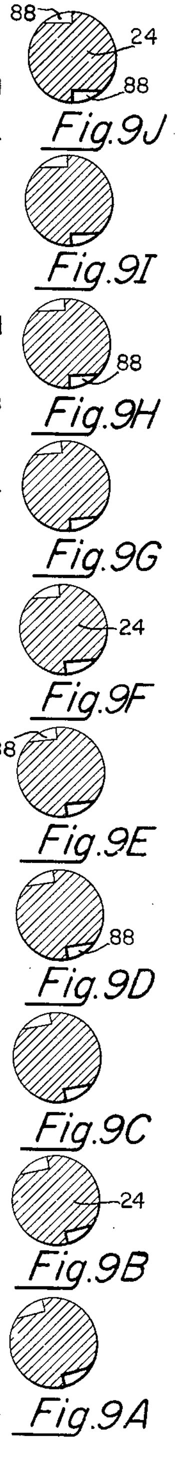

Each assembly 70 includes a printed circuit board 75 having groups of printed conductor segments 76 and 77. The group of segments 76 are related to error detection circuitry while the second group of segments 77 correspond to the spot positions in a given column of the spot field 25 of document D. More particularly, the segments 77 are representative of the digits 0–9 which may be stored in said column. Rotating on a hollow stud 78, fixed to board 75 by nut 79, is an integral wiper gear-ratchet wheel unit 80. The unit includes a wiper gear 81 and a ratchet wheel 82, each integrally united to hub 83, the latter being rotatable about stud 78. The wiper gear 81 includes a plurality of gear teeth 84 about its periphery, and in addition includes brushes affixed to one face of the gear which, when rotated, causes the brushes to wipe the various segments 77 of the board 75. The ratchet wheel 82 includes a plurality of teeth, or flats, 86, which enable the wiper unit to be stopped in a predetermined position corresponding to the digital value of the spot scanned. The ratchet wheel carries with it a pawl 87 which engages one of opposing notches 88 in the shaft 24 which passes through all of the printed circuit assemblies 70. The shaft 24 rotates continuously and the gear-ratchet wheel units rotate synchronously with the shaft until the rotary motion of the units is arrested by means to be later described. It should be recalled, in addition, that the notched shaft 24, which runs the full length of the storage unit, is geared to rotate at a slower speed than the scanner unit 7. A spring 89 urges the pawl 87 into notch 88 of the shaft. As seen in FIGS. 8 and 9, the pairs of notches 88 are disposed in spaced relation along the length of the shaft 24, and as seen in FIGS. 9A to 9I, inclusive, are progressively offset radially. The above described orientation of the notches in the shaft is such that when the pawl 87 of each ratchet wheel-wiper unit 80 is in its associated notch, the units 80 are rotating in synchronism with the notched shaft 24, and also the scanner unit 7.

Also suitably affixed to each printed circuit board 70 is a solenoid assembly 90 which includes a pivotally mounted clapper 91 in the form of a bellcrank having one arm 92 adapted to engage teeth 86 of ratchet wheel 82. The other arm 92 of the bellcrank is suitably connected to relay wiper wheel 94, the latter being rotatable about shaft 95, secured to board 70 as indicated at 96. The wheel includes brushes 97 which wipe the segments 76 of the board. The arm 93 transmits rotary motion to wheel 94 by means of pin 98, which is received in slot 99 of the wheel. As before mentioned, the relay wheel 94 and corresponding segments 76 are used in error checking circuits. The solenoid assembly 90 includes a solenoid 100 which in one state operates to hold the clapper arm 92 out of engagement with ratchet wheel 82, but on signal from a thyratron associated with the particular circuit board, to be later described, permits the clapper to drop out and engage the ratchet wheel 82 under the urging of spring 101 as the magnetic flux decays. The free end of arm 92 engages a tooth 86 on the wheel, the timing of the drop-out being so synchronized that the final position of the wipers 85 on the gear wheel 81 provides proper selection and contact with circuit segments 77. The other arm 93 of the clapper moves relay wheel 94 so that it assumes a position which is indicative of the fact that the clapper has dropped out and has engaged a tooth on the wheel 82, and more particularly that a spot has been seen on the document, or check, in the column which is represented by a particular circuit board.

When the arm 92 of the clapper 91 is disengaged from the ratchet wheel 82, a friction drive unit 105 (FIG. 12), is provided to cause the gear wiper-ratchet wheel unit 80 to rotate in synchronism with the notched shaft 24. Each friction drive unit 105 is mounted on a constantly rotating shaft 106 journalled for rotation between plates 11 and 12 and driven by gear 107 affixed thereto, see FIG. 1. Gear 107, FIG. 6, meshes with gear 23, and as a consequence the friction drive shaft 106 is driven to rotate at a faster speed than the notched shaft 24. Returning now to FIGS. 10 and 12, each friction drive unit 105 is shown as including a friction drive gear 110 which is freely rotatable about friction drive shaft 106. The friction drive gear meshes with wiper gear 81, FIG. 10. A pair of polished steel discs 112 are suitably locked for rotation with shaft 106 and are disposed adjacent each face of the friction gear 110. Interposed between steel discs 112 and the friction drive gear 110 are a pair of oiled felt washers 11. The discs and washers are contained within shroud segments 113. As seen in FIG. 12, the shroud segments are restrained against axial movement relative to shaft 106 by means of snap rings 114 received in notches 115 at spaced intervals along the length of shaft 106. Each shroud, or cover, 113 includes a reduced annular port on 117, and the reduced portions are encircled by means of a coiled spring 118. The annular spring produces an axial thrust which is resisted by the snap rings 114 secured in shaft 106.

The aforementioned thrust operates to reduce the axial distance between pairs of corresponding shroud members 113 and to thereby produce frictional forces between the steel discs 112 and felt washers 111 to cause friction gear 110 to rotate in unison with shaft 106. Rotation of friction gear 110 will produce a corresponding rotation in the wiper gear unit 80 unless such rotation is stopped by the engagement of ratchet arm 92 with teeth 86.

It was previously stated that shaft 106 rotated at a greater speed than the notched shaft 104. Consequently upon disengagement of clapper arm 92 from its associated ratchet wheel the friction drive unit 105 will rotate the gear wiper unit 80 at a faster rate of speed than its associated shaft 24 until such time as the pawl 87 is in engagement with its associated notch 88 in shaft 24. It will be appreciated that in a former state, i.e., when clapper arm 92 restrains the wiper unit 80 against rotation, the shaft 24 will be rotating in such a direction as to cause the pawl to override the shaft and to produce intermittent angular, or ratcheting action, of pawl 87.

The circumferential positions of the notches 88 along the length of the shaft 24 are progressively offset with respect to one another, see FIGS. 8 and 9. The purpose for this offset relationship is to provide the maximum amount of time for the clapper arm 92 of the solenoid assembly 90 to engage a given tooth on the ratchet wheel 82, FIG. 10. The ratchet wheel 82 will rotate the angular distance between two adjacent teeth as an individual lens system scans a complete row, i.e., across all nine columns. Thus, if a spot occurs in the first column which is scanned, the clapper of the solenoid in the circuit board corresponding to that column will have a maximum amount of time to engage the tooth during rotation of the ratchet wheel. However, if a spot occurs in the same row but in the last column, the tooth will have rotated so that only a very short interval of time remains for the engagement of the clapper of the last circuit board assembly with its associated tooth.

The storage unit 10 includes a differential timing disc unit associated with the previously mentioned ratchet shaft 24, which is used to obtain timing for the document reading cycle. This assembly is very similar in its mechanization to the printed circuit boards 70. The difference lies in the fact that the differential timing unit 120 includes a printed circuit disc 121 which is fixed to shaft 24 and rotates in unison with the shaft, whereas the printed circuit boards 70 always remain stationary. The printed circuit disc 121 is shown in FIG. 12 as being mounted on hub 122, secured to the shaft by set screw 123. The hub 122 includes an elongated sleeve portion 124 and provides the rotative support for wiper gear-ratchet wheel assembly 125, which is similar to the wiper gear-ratchet wheel units 80 previously described. It includes a friction drive gear unit 126 which, as seen in FIG. 12, is identical to the friction drive unit 105. A solenoid unit 127, seen in the schematic view, FIG. 18, is likewise identical with the solenoid unit 90 used to arrest the wiper gear-ratchet wheel units 80. The differential motion disc 121 includes on one face 121*a* a plurality of circular segments 130, see FIG. 14. The opposite face 121*b* of the differential motion disc is shown as including a plurality of arcuate segments 131, as illustrated in FIG. 15. Each circular segment 130 is electrically connected to a corresponding arcuate segment 131 through the disc. The arcuate segments 131 are engaged by brushes 132 secured to the wiper gear 133 of the unit 120. Various signals can be taken from the differential motion disc 121 to show when the scanning of the check field has been completed and to indicate when to make error checks. The signals may be taken from the constantly rotating differential motion disc 121 through four commutating brushes 135 mounted on block 136, which is in turn secured to the end plate 11 of the storage unit. As seen in FIG. 12, only one of the four brushes 135 referred to is shown, but with reference to FIG. 18 it will be seen that a brush is provided for each of the four circular segments 130 on face 121*a* of disc 121.

As shown in FIG. 18, the two faces 121*a* and 121*b* of disc 121 are illustrated as two separate discs for purposes of illustration. A signal from a thyratron, to be later described, will operate to cause the solenoid unit 127 to drop its clapper 140 to thereby arrest the motion of the wiper gear ratchet wheel unit 120, thus causing the wipers 132 (FIG. 12) on the face of the gear 133 to wipe across the arcuate segments 131 on face 121*b* of rotating disc 121, illustrated in FIG. 15. This movement of the successive arcuate segments 131 relative to the stationary ratchet wheel unit is effective to operate the control circuitry and provides the timing for the various components in the reading cycle.

When the information stored in the various printed circuit boards 75, by virtue of their associated gear wiper units 80 have been utilized, the storage unit must thereafter be restored to an initial state. To accomplish this clapper arms 92 (FIG. 10), associated with each unit, must be disengaged from their associated ratchet wheels 82. For this purpose a reset shaft 145 extends transversely across the unit and has a bellcrank 146 affixed at its end. As best seen in FIGS. 1 and 6, the shaft is journalled for rotation in end plates 11 and 12 of the storage unit and includes a plurality of arms 147 spaced along its length. An arm 147 is provided (FIG. 10) for each of the solenoid assemblies 90 and for the solenoid assembly 127 of the differential motion disc assembly 125, see FIGS. 10 and 18. Each assembly has a coil spring **145*a* associated therewith. Each spring encircles the shaft 145 and has one of its ends in engagement with reset arm 147 while its other end engages a pin 145*b* affixed to the shaft. When the shaft is initially rotated in a clockwise direction springs 145*a* move their reset arms against clappers 91, thus to disengage them from ratchet wheels 92. Upon further rotation of the shaft in the same direction each clapper arm 92 is brought into physical contact with the core of the magnet 100. Rotation of shaft 145 is accomplished by the transmittal of power from the power source through clutch 150 which operates to rotate the bellcrank 146 affixed to the end of shaft 145** (FIG. 6)

Referring to FIG. 1, the clutch 150 is shown as being housed between storage plate 12 and clutch-supporting plate 151. Also referring to FIG. 6, it will be seen that clutch 150 includes an electromagnet 155 affixed to plate 151 by means of a bracket 152. Upon being energized magnet 155 causes clapper 156 to strike arm **157*a* of stop lever 157, thus to rotate its lower end 157*b* (FIG. 6) clear of the reset sensing clutch dog 158. Stop lever 157, it will be observed, is pivotally mounted as at 159 to plate 151. The clutch dog 158 engages a toothed wheel 163 which rotates integrally with gear 164. The toothed wheel 163 and gear 164 are constantly rotating about shaft 162 by virtue of gear 164 meshing with continuously rotating gear 23. Clapper 156, upon de-energization of magnet 155, is urged away from said magnet by spring 165 connected at one of its ends to an extremity of said clapper and at its other end to bracket 152. Stop lever 157 is likewise normally moved by means of spring 166, affixed at one of its ends to pin 167 mounted on said lever and at its other end to spring post 168 fixed to clutch plate 151**.

The above-mentioned clutch dog 158, upon being released by counterclockwise rotation of lever 157, is urged into engagement with toothed wheel 163 by spring 170 secured at one of its ends to pin 171 affixed to dog 158, and at its other end to pin 172 mounted on the anti-backup cam 161. An anti-backup pawl 175 provides a repeatable start, or reference position, for the anti-backup cam 161. Pawl 175 is pivotally mounted on shaft 159 and is urged into contact with the outer periphery of cam 161 by spring 176 connected at one end to pawl 175, and at its other end to bracket 152. Reverse, or clockwise rotation of clutch assembly 150 is prevented by virtue of engagement of pawl 175 with shoulder 177 on the cam. A second cam 180 rotates integrally with anti-backup cam 161 about shaft 162, thus every time the clutch is energized the latter cam 180 will be rotated counterclockwise through a cycle of rotation. The aforementioned bellcrank 146, affixed to reset shaft 145, carries a roller 181 on its upper arm, which roller engages the periphery of the reset cam 180. The lower arm of bellcrank 146 is connected to one end of a spring 182, the other end of which is connected to plate 12 thus to urge roller 181 into engagement with the periphery of cam 180. It is thus seen that when clutch 150 is cycled the reset shaft 145 is rotated by the action of cam 180 and the aforementioned arms 147 (FIG. 10) affixed along its length operate to disengage the clappers 92 from their associated ratchet wheels to permit the friction gears to restore the wiper gear units to synchronous rotation with notched shaft 24.

Figure 5:
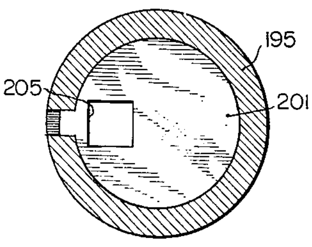
FIG. 5 is a sectional view taken along the line 5—5 of FIG. 4.

FIGS. 4, 5, 16 and 17 illustrate in detail the manner by which a given lens assembly 37 scans its corresponding row of spots on the document D. The lens assembly 37 includes a lens-mounting tube 195, which maintains objective lens 196 in spaced relationship with respect to field lens 197. The object lens 196 is secured in bushing 198 by means of a snap-ring 199, and the bushing is mounted in the outer end of tube 195 by screw **198*a*. Provision is made for lateral adjustment of the bushing and objective lens mounted therein by means of screw 200. A mask 201 is interposed between the objective lens and the field lens 197 within the tube 195. A spacer 202 permits seating of the mask 201 relative to the field lens 197, and the latter is secured within the lower portion of the tube by means of a snap-ring 203. As seen in FIG. 5 the mask 201 is provided with an off-centered square aperture 205 which limits the scanning of the lens assembly across the surface of the document D to the size of a single spot thus to produce a peak signal when this aperture coincides with a spot on a check. A spot, which is viewed by the lens assembly, is focused as at 40 (FIG. 16) on the photocathode target 39** at a magnification of approximately 1 to 1.

Because photocell cathodes sometimes have areas along their length of different sensitivity, all of the lens assemblies 37 are mounted in the hollow drum 36 of the rotor so that the optical images obtained by the assemblies are focused on the same area 40 of the cathode 39 thus to avoid dissimilar responses due to such changes in sensitivity of the cathode. The apertures 205 of the masks 201 are off-center and when taken in conjunction with the edge portion of the lens 197 insure that the images are thus focused on the same target area 40 in the manner to be now described. It is observed that the principal axis AB (FIG. 16) of the lens assembly 37 is inclined with respect to the axis X—X of rotation of the rotor which, in this instance, corresponds, or is contained in the plane of the cathode 39, and that it intercepts the the document D at angle B. As the axis AB is rotated about the axis of the rotor X—X, axis AB generates a cone. The trace, or line of intersection, between this latter cone and the plane of the document 4 which is parallel to line X—X, is a curved line W—W, hyperbolic in form, see FIG. 17. Put another way, the trace of point B on document D as the line AB is rotated about the axis X—X, generates a curve trace W—W which is a hyperbola. As seen in FIG. 17, the trace W—W is such that it does not intersect all of the possible spot positions in the row which it is scanning in the same manner. As a consequence all of the possible signals in the row would be dissimilar. To reduce the curvature of the trace W—W it is apparent that the angle which the axis of the lens assembly makes with the document must be more nearly a right angle with the document. For example, if the line AB were normal to the document D the trace which that line, or axis AB, would make with the document would be a straight line and would correspond to the line Y—Y in FIG. 17. However, if all the lens assemblies were oriented normal to the axis of rotation then the same images of the respective lens assemblies would be focused along the length of the cathode 39 instead of being focused in a given spot area as at 40. The signals so received in this situation might vary in accordance with different sensitivity ranges along the length of the photocathode. In order, therefore, to reduce the hyperbolic curvature which each lens system would make with the document as it scans its respective row of spot positions on the card, the mask 201 is interposed between the aforementioned objective and field lenses. It is observed in particular that the mask 201 passes light through the field lens only at its edge portion. This edge portion of the lens operates as a prism. It, in effect, bends the principal light ray CE which passed through the center of aperture 205 of the mask. It can be seen that the ray CE is bent and is directed along the line CA to fall on the spot 40 of the photocathode 39. The line CE intercepts the plane of the document D at the angle $\alpha$. As the line CE is rotated about the axis X—X it produces a trace Z—Z as shown in FIG. 17. By comparison with trace W—W, the trace Z—Z is of flatter curvature. The trace Z—Z likewise more nearly approaches and coincides with the straight line Y—Y passed through the centers of the row of spots which is being scanned. It is thus seen that the mask, in addition to delineating the focusing and limiting the focusing to a given spot, permits the various lens assemblies to focus on a given target area of a single cathode of a photomultiplier.

The overall operation of the apparatus may best be followed by reference to FIG. 18. The document D has a specific code applied to its face and is representative of a nine-place number. Digit information is arranged in each column which corresponds to the place in the number and the value of the digit is determined upon its position in the column, serially, for example, with "0" represented at the bottom, and "9" at the top. The manner of reading is to scan the coded information by columns thus scanning all the nine digits to find if any of the columns have a "0" digit, a "1" digit, a "2" digit, etc The information is stored in a register which is comprised of nine 10-position switches 70. The coded information may be of any optical form and in the present embodiment is in the form of light emitting material such as fluorescent ink which is optically scanned and is designed to scan the nine columns representing the nine digits serially. As the zero lens units scan the "0" row, for example, if there is a mark or indicia corresponding to "0" in the first digit position then the 10-position switch 70 representative of this digit will be locked in a position corresponding to the "0" digit. Motion of the decimal switches wiper unit 80 is synchronized mechanically with the optical scanning, and this information is stored in the switches as scanned.

The document to be read is placed in the reading station; the optical scanning head is continuously rotating at a constant velocity and has on it ten optical system operating over an arc of 36°. Rotating with the optical system is a timing disc which is divided into 100 units. As the timing disc rotates through each 100th of a revolution a timing pulse is produced by the photomultiplier clock 60.

A reset signal from a printer, or the utilizing device, which may be of the type described and claimed in the patent of Bradshaw et al., entitled "Differential Type Setting and Resetting Means," Serial No. 2,822,752, filed February 11, 1958 and assigned to the same assignee as the present invention, causes the clutch magnet 55 to be pulsed. The reset bail 145, through arms 147, disengages the clappers 92 from the wiper units 80 and permits the latter to be restored to their initial condition rotating in synchronism with the optical scanning head. Mechanical power is applied to constantly rotate shaft 15, which in turn rotates the rotor shaft 16. The notched shaft 24 is continuously rotated, as is the rotor shaft 16, but at a reduced rate of speed, while the friction drive shaft 106 is likewise constantly rotated but is driven at a faster rate of speed than the notched shaft 24.

The apparatus is concerned with three input signals, namely, the signal obtained from the spot on the document D, the disc signal which is a timing signal, and the ready-to-read signal. More particularly, it is seen that the spot signal feeding into the photomultiplier 35 is the light information reflected from spot 26 on the document D, which spot has been illuminated by means of light source 28 in conjunction with mirror 33. The output of the photomultiplier 35 is passed through circuit 210 and is received by signal diode 211 which is a four-input "and" gate. An "and" gate well known in the art provides an output on coincidence of signals on each of its inputs. In a similar manner the disc, or timing signal, from photomultiplier 61 is conveyed to the signal diode gate 211 through circuit 212. The third signal referred to arrives by way of lead 228 and constitutes a ready-to-read signal which signifies that the document has been properly positioned with respect to the rotor 36 and is ready to be read.

When a check moves into place and is ready to be read, the ready-to-read signal arriving on lead 213 will change from a negative to a zero bias on the No. 2 grids of the differential motion disc (DMD) thyratron gate 214, and the start thyratron gate 215. Timing pulses are being produced at a constant rate and the next timing pulse is applied to the number one grid of a two-input diode gate 216. The two inputs of the diode gate 216 are the disc signal obtained from the photomultiplier 61 over leads 212 and 212a; the second input is a start pulse obtained from the distributor 7b, obtained when the distributor movable arm engages the zero or start terminal at the upper right hand portion of FIG. 18. The start pulse of the distributor is conveyed by lead 219 to the differential motion disc unit 120, and more particularly to surface 121a thereof. The pulse is conveyed to the opposite surface 121b by lead 220 and thence through wipers 132 through segment 221 through lead 222, and then to lead 223. The distributor start pulse is then routed through the normally closed contact 224 and thence to lead 225 into the diode gate 216. It is thus seen that the simultaneous application of the first start pulse following the ready-to-read signal and the clock pulse will open the diode gate 216. The output of the diode gate 216, plus the ready-to-read signal, as previously mentioned, causes the start thyratron 215 and the DMD thyratron 214 to fire. The output of the start thyratron is connected to the input 228 of the signal gate 211. At the same time the output of the diode gate 216 and the ready-to-read signal over lead 230, will fire the differential motion disc thyratron 214. From thyratron 214 the signal therefrom is transmitted over lead 231 to the differential motion disc magnet 127. This signal causes clapper 140 to drop out and arrest the rotation of the wiper unit 125 when the ratchet wheel rotates through the angular distance between two adjacent teeth. In other words, the ratchet wheel of the unit will not be arrested until the wheel rotates through one tooth distance.

The signal gate 211 having now been opened, will permit information to be stored in the storage units 70 in the following manner. Each time the lens unit 37, associated with the optical scanning system, is focused on an area containing a fluorescent spot the photomultiplier 35 will produce a pulse which is applied to the input terminal 210 of gate 211. As just described, the output of the start thyratron 215 opens signal gate 211 and thereafter coincidence of a spot signal obtained from photomultiplier 35, and a clock pulse obtained from photomultiplier 61, will produce parallel outputs 241–249, inclusive, from the signal gate 211. These outputs are used to drive the No. 1 grids of the storage thyratron 251–259, inclusive. The No. 2 grids are driven by the 1 to 0 outputs of the distributor 7b. Coincidence of an output from the signal gate 211 over one of the aforementioned leads 241–249 inclusive, and a distributor pulse at any one of the thyratrons 251–259 inclusive, will fire that thyratron causing the associated solenoid 100 to drop out and arrest the motion of its associated wiper unit 80. Thereafter a successive lens assembly 37 will scan its corresponding row of spots on the document D, and corresponding wiper units 80 will be arrested in the same manner.

Since the reading drum and the document handling equipment (the latter not described), are asynchronous, the ready-to-read signal may occur at any time during the rotation of drum 36. Since reading will commence on the first start signal following the ready-to-read signal, the first digit to be scanned may be any one of the ten, i.e., reading may commence with any one of the ten lens units 37.

Since reading cannot be permitted to proceed past the last spot prior to the one at which reading began, means are provided for closing the signal gate 211 during the time of the 101st clock pulse following the one which opened the gate 211. This timing is accomplished by the differential motion disc 120. As mentioned before, the pulse from the output of the differential motion disc thyratron 214 over lead 231 caused the solenoid 127 to drop out. This action arrested the motion of the rotating wipers 132 and induced differential motion between the wipers and the printed circuit disc 121, which previously moved synchronously with the wiper unit 125. As the differential motion between the disc 121 proceeds relative to the arrested wiper unit 125, the wipers 132 are successively connected to the pads or printed circuit segments 260, 261. When the printed circuit disc 121 has rotated so that the wiper 132 is on segment 260 of the disc, a pulse will travel via 261, 262, and will open the relay at 224 and close the relay at 265. Further rotation of the differential motion disc 121 will rotate the pad 266 into contact with the brush 132, such that the 101st clock pulse corresponding to the 11th start pulse will pass from the pad over lead 267, lead 268, and through the closed relays 265 to the two-input diode gate 269. This 101st clock pulse will also enter the diode gate 269 with a corresponding disc pulse obtained from the photomultiplier 61 over lead 212*a*. The output of the two input diode gate 269 will fire the stop thyratron 270, which in turn will, by means of lead 271, close the signal gate 211. Thus the closing of the signal gate 211 prohibits any further signal pulses going to the storage thyratron circuits 241–249, inclusive.

After the information in the nine decimal switches 70 has been utilized by the utilizing device, a reset signal is received by the clutch magnet 105 which, through bail 145, permits the wiper units 125 to be restored to their initial position, i.e., rotating with their pawls 87 engaging notched shaft 24 and rotating in unison with the scanning unit. The reset shaft at the same time permits the wiper 125 associated with the differential motion disc to be reset in an identical manner with wiper units 80.

Having described a preferred form of the invention it will be understood that other forms thereof will fall within the scope of its teaching and the following claims.

What is claimed is:

1. In apparatus for sensing and storing information recorded on a document, said information comprising indicia disposed in discrete areas and arranged in rows and columns in a field of the document, a rotatably mounted drum including a plurality of lens systems arranged to serially scan each incremental area in said field, means for illuminating said field, photosensitive means mounted within said drum to receive the light reflected from said incremental areas through said lens systems, switch means including means movable in synchronism with said rotatable drum, electro-magnetic means for arresting the movement of said movable means, and circuit means responsive to said photosensitive means to actuate said electromagnetic means for arresting said movable means in accordance with the location of said indicia in said field.

2. In apparatus for sensing and storing information recorded on a document, said information comprising indicia disposed in discrete areas and arranged in rows and columns in a field of the document, said indicia taken together being representative of a multi-digit number and wherein each area containing indicia therein is representative of a digit of the number, the column position of each indicia corresponding to the place of the digit in the number, and the row position of each said indicia corresponding to the value of the digit in the number, a rotatably mounted drum including a plurality of lens systems arranged about the periphery thereof to scan serially the indicia contained in the field of the document, means for illuminating the field, photosensitive means mounted within said drum for producing output signals from the light reflected from the indicia through said lens systems, switch means corresponding in number to said columns of indicia and including means movable in synchronism with said drum, electro-magnetic means for arresting the movement of said movable means, and circuit means responsive to said output signals from said photoelectric cell for actuating said electro-magnet means to arrest said movable means in positions representative of the value of the indicia scanned.

3. In apparatus for sensing and storing information recorded on a document, said information comprising indicia disposed in discrete areas and arranged in rows and columns in a field of the document, said indicia taken together being representative of a multi-digit number and where each area containing indicia thereon is representative of a digit of the number, the column position of each indicia corresponding to the place of the digit in the number, and the row position of each said indicia corresponding to the value of the digit in the number, a rotatably mounted drum including a plurality of lens systems arranged about the periphery of the drum to scan serially the indicia contained in the field of the document, the axes of said lens systems being angularly displaced relative to each other but each intersecting the axis of said drum at a common point, photo-cathode means mounted at said common point for producing output signals from the light reflected from the indicia through said lens systems, switch means corresponding in number to said columns of indicia and including contact means movable in synchronism with said drum, electromagnetic means for arresting the movement of said movable means, and circuit means responsive to said output signals from said photo-cathode means for actuating said electro-magnetic means to arrest said movable means in positions representative of the value of the indicia scanned.

4. The apparatus set forth in claim 3 wherein said lens systems each include a mask having an aperture therein which is offset from the principal axis of the lens system to increase the effective angle of incidence of said lens system relative to said document.

5. In apparatus for sensing and storing information recorded on a document, said information comprising indicia disposed in discrete areas and arranged in rows and columns in a field of the document, said indicia taken together being representative of a multi-digit number and wherein each area containing indicia thereon is representative of a digit of the number, the column position of each indicia corresponding to the place of the digit in the number, and the row position of each said indicia corresponding to the value of the digit, a rotatably mounted drum including a plurality of lens systems arranged about the periphery of the drum to scan serially the indicia contained in the field of the document, the axes of said lens systems being angularly displaced relative to each other but each intersecting the axes of said drum at a common point, a photosensitive device mounted at said point for producing output signals from the light reflected from the indicia through said lens systems, signal emitting means associated with the rotation of said drum for emitting a signal simultaneously with the scanning of each area in said field, switch means corresponding in number to said columns of indicia and including contact means movable in synchronism with said drum, electro-magnetic means for arresting the movement of said movable means, and circuit means responsive to the coincidence of output signals from said photo-electric cell and said signal emitting means for actuating said electro-magnetic means to arrest said movable contact means in positions corresponding to the row and columnar positions of the indicia sensed.

6. In apparatus for sensing and storing information recorded on a document in the form of fluorescent indicia disposed in discrete areas and arranged in rows and columns in a field of the document, a rotatably mounted drum including a plurality of lens systems arranged about the periphery of the drum in a manner to scan serially the indicia contained in the field of the document, means for projecting ultra-violet light upon the field of said document to illuminate said indicia, a photocell mounted within said drum from producing output signals from the light reflected from the fluorescent indicia through said lens systems, signal emitting means synchronized with the rotation of said drum for producing a signal simultaneously with the scanning of each area in said field, switch means corresponding in number to said columns of indicia and including contact means movable in synchronism with said drum, electro-magnetic means for arresting the movement of said movable means, and circuit means responsive to the coincidence of the output signals from said photocell and said signal emitting means for actuating said electro-magnetic means to arrest said movable contact means in positions corresponding to the value of the indicia scanned.

7. In apparatus for scanning and storing information recorded on a document, said information comprising indicia disposed in discrete areas and arranged in rows and columns in a field of the document, a rotatably mounted drum including a plurality of lens systems arranged about the periphery of the drum to scan serially the information contained in the field of the document, a photocell mounted within the drum for producing an output signal from the light reflected from the indicia through the lens systems, signal emitting means for producing a signal simultaneously with the scanning of each area in said field, a plurality of digit storing switches, one for each column and each having a plurality of positions repretative of the value of the indicia being scanned and each such position corresponding to a discrete area in said field, commutator means on each switch normally movable in synchronism with said lens systems, a drive shaft common to said commutator means, said shaft including a plurality of notches disposed along its length and radially offset relative to one another, pawl means engageable in said notches and connected to said commutator to limit the rotation of the latter, electro-magnetic means for arresting the movement of said commutator means, and circuit means responsive to coincidence of signals from said photocell and said signal emitting means for actuating said electro-magnetic means to lock each commutator means in a position corresponding to the value of the indicia sensed.

8. The apparatus as set forth in claim 7 including friction drive means individual to each commutator to normally urge the latter to rotate in unison with said drive shaft and adapted to slip relative to said commutator when the latter is arrested by said electro-magnetic means.

References Cited in the file of this patent

UNITED STATES PATENTS

| | | |
|---|---|---|
| 2,254,932 | Bryce | Sept. 2, 1941 |
| 2,294,734 | Bryce | Sept. 1, 1942 |
| 2,337,553 | Hofgaard | Dec. 28, 1943 |
| 2,382,251 | Parker | Aug. 14, 1945 |
| 2,710,934 | Senn | Jan. 14, 1955 |
| 2,724,014 | Edgar | Nov. 15, 1955 |
| 2,742,631 | Rajchman | Apr. 17, 1956 |
| 2,783,454 | North | Feb. 26, 1957 |
| 2,848,535 | Hunt | Aug. 19, 1958 |

FOREIGN PATENTS

| | | |
|---|---|---|
| 686,642 | Great Britain | Jan. 28, 1953 |

OTHER REFERENCES

"Crystal Ball Plots 3-D Curves in Color," Electronic Industries and Tele-Tech, Feb. 1957, pp. 50 to 53.